(12) United States Patent
Van Biesen (10) Patent No.: US 7,130,094 B2
(45) Date of Patent: Oct. 31, 2006

(54) DEVICE AND A METHOD FOR DEFLECTING A LASER BEAM

(75) Inventor: Marc Van Biesen, Ghent (BE)

(73) Assignee: Newson Engineering N.V., Overmere-Berlare (BE)

( * ) Notice: Subject to any disclaimer, the term of this patent is extended or adjusted under 35 U.S.C. 154(b) by 151 days.

(21) Appl. No.: 10/473,373

(22) PCT Filed: Mar. 28, 2002

(86) PCT No.: PCT/EP02/03493

§ 371 (c)(1), (2), (4) Date: Feb. 2, 2004

(87) PCT Pub. No.: WO02/079855

PCT Pub. Date: Oct. 10, 2002

(65) Prior Publication Data

US 2004/0109214 A1 Jun. 10, 2004

Related U.S. Application Data

(60) Provisional application No. 60/290,479, filed on May 10, 2001.

(30) Foreign Application Priority Data

Apr. 2, 2001 (EP) .................................. 01870074

(51) Int. Cl.
*G02B 26/08* (2006.01)

(52) U.S. Cl. ...................... 359/198; 359/199; 359/214; 359/226; 359/201; 359/900

(58) Field of Classification Search ..................... None
See application file for complete search history.

(56) References Cited

U.S. PATENT DOCUMENTS

| 3,737,697 A | 6/1973 | Kitamori et al. |
| 3,993,920 A | 11/1976 | Sato |
| 5,138,477 A | 8/1992 | Omura et al. |
| 5,304,886 A | 4/1994 | Yang |
| 5,422,471 A * | 6/1995 | Plesko .................... 235/462.36 |

* cited by examiner

*Primary Examiner*—James Phan
(74) *Attorney, Agent, or Firm*—Knobbe, Martens, Olson & Bear LLP (57) ABSTRACT

The present invention relates to a device for deflecting a laser beam, comprising at least a single sided mirror (1) and means for orientating said mirror, wherein said single sided mirror is attached on one end of said axis (3) such that it can rotate about said axis and, that the means for orientating said mirror comprise means (6) for providing a magnetic field and means for providing a charged particle having a velocity v, whereby the orientation of said mirror is controlled by the resulting Lorentz force. The invention further relates to a method for deflecting a laser beam with the use of a mirror supported by an axis such that it can rotate about said axis and to a laser beam deflecting apparatus.

18 Claims, 7 Drawing Sheets

DEVICE AND A METHOD FOR DEFLECTING A LASER BEAM

RELATED APPLICATIONS

This application is a national phase entry in the United States of the International Application PCT/EP02/03493 filed Mar. 28, 2002 and claims the benefit of the U.S. Provisional Application No. 60/290,479 filed May 10, 2001 and the European Patent Application 01870074.0 filed Apr. 2, 2001, all of which are incorporated herein in their entirety.

TECHNICAL FIELD

The present invention relates to a device and a method for deflecting a laser beam of the type comprising a mirror and means able to position said mirror by angle rotation.

In particular the present invention is related to a device suitable for deflecting a laser beam, comprising a mirror and means for orientating said mirror, wherein said mirror is supported by an axis such that said mirror can angle rotate about said axis based on the electromotor principle.

BACKGROUND ART

Lasers are currently used in numerous applications in which it is necessary to control the laser beam. A laser head in which the beam is deflected by reflection from two mirrors controlled by two galvanometers is commonly used for marking supports such as plastic or metals. Galvanometers are known means for controlling the rotation angle of the mirrors, wherein (electro)magnets within the galvanometers are brought in rotational movements. Each mirror is made to rotate in a controlled way about its own axis by the corresponding galvanometer, and the two axes are in general orthogonal positioned with respect to each other. In this way, the outgoing beam can be deflected according to a system of coordinates and its path can be controlled to obtain the required working. The present invention is related to similar devices in which two separate mirrors are able to deflect a laser beam in order to obtain all possible positions within an X-Y coordinate plane. The invention is in particular related to such a single device able to control the angle rotation of said mirror in a precise manner.

Another prior known method and device for the control of the angle rotational movement of these deflecting mirrors is the use of a plurality of electromagnets whereby elastic forces balance the magnetic forces acting upon a mirror.

In the present text 'angle rotation' means any rotational movement over an angular reach, which angular reach may be positive or negative and being in general smaller than 180°.

Other applications of these devices are for example in the medical field whereby for various treatments use is made of a laser beam controlled by means of a pair of galvanometers to execute a scanning movement.

The currently known deflection systems controlled by corresponding galvanometers are complicated, cumbersome and inaccurate. Furthermore their reaction time is long and becomes unacceptable. Another problem is the high impedance of the existing angle rotation devices, due to the high number of current wires within the electromagnets, which are needed to provide a reasonable strong magnetic field.

The purpose of the present invention is to provide an alternative for the commonly used galvanometers, such that the present invention provides a laser beam deflection device which is more compact and accurate and easy to fabricate and which permits a more precise and a more rapid manipulation of the laser beam. Another object is to provide an angle rotating device having a low impedance and as a result thereof provides for a more accurate and faster reaction time for the rotational movement.

DISCLOSURE OF THE INVENTION

The present invention is related to a device for deflecting a laser beam, comprising at least a single sided mirror and means for orientating said mirror, wherein said single sided mirror is attached on one end of said axis such that it can rotate about said axis and, that the means for orientating said mirror comprise means for providing a magnetic field and means for providing a charged particle having a velocity v, whereby the orientation of said mirror is controlled by the resulting Lorentz force, characterized in that, the means for providing a magnetic field comprise a number of discrete magnetic poles and the means for providing a charged particle having a velocity v, comprise an electrical source generating the movement of electrical particles through a corresponding number of conductor areas provided on a rotor.

Essentially, the device and the method according to the invention make use of a magnetic field and a moving charged particle whereby a variation of at least one parameter results in a rotational movement of a mirror. The main technical aspect of the present invention is the use of the Lorentz force for providing said angular reach rotating to the mirror. A magnetic field B imparts a force on moving charged particles. The entire electromagnetic force on a charged particle with charge q and velocity v is called the Lorentz force after the Dutch physicist Hendrik A. Lorentz, and is given by:

$$F=qE+qv*B.$$

The first term is contributed by the electric field which is in the preferred embodiments zero. The second term is the magnetic force and has a direction perpendicular to both the velocity v and the magnetic field B. The magnetic force is proportional to the charge q and to the magnitude of v* B. In terms of the angle α between v and B, the magnitude of the force equals qvB sin α. As a result the Lorentz force acts on the charged particle in a uniform magnetic field. If v is perpendicular to B (i.e., with the angle between v and B of 90°), the particle will follow a circular trajectory with a radius of r=mv/qB. If the angular reach is less than 90°, the particle orbit will be a helix with an axis parallel to the field lines. If the angular reach is zero, there will be no magnetic force on the particle, which will continue to move undeflected along the field lines. If a wire with a current i is placed in an external magnetic field B, the force on the wire will depend on the orientation of the wire. Since a current represents a movement of charges in the wire, the Lorentz force given in the above equation acts on the moving charges. Because these charges are bound to the conductor, the magnetic forces on the moving charges are transferred to the wire. The force on a small length dl of the wire depends on the orientation of the wire with respect to the field. The magnitude of the force is given by idlB sin w, where w is the angular reach area between B and dl. There is no force when w=σ or 180°, both of which correspond to a current along a direction parallel to the field. The force is at a maximum when the current and field are perpendicular to each other. The force is obtained from the equation and is given by: dF=idl*B. Again, the cross product denotes a direction perpendicular to both dl and B. It is clear that the device according to the invention is also applicable not only for deflecting laser beams, but also for controlling all functional elements, such as cutting tools or printer heads able to be supported by an axis or a shaft.

The use of said Lorentz force as a result of the interaction of charged particles having a charge q and velocity v within a magnetic field B for the control of angle rotation provides the advantages as explained above.

In a preferred embodiment the rotor is positioned inside a magnetic field generated by the discrete magnetic poles, whereby each angular reach defined by said magnetic poles has a spatial overlap with the corresponding angular reach defined by the conductor, whereby the excess of angular reach, i.e. the excess of overlap, defines the angular reach for the orientation of the mirror. This excess in the spatial overlap is an essential aspect of the present invention and will be completely understood with reference to the drawings.

In another preferred embodiment the means for providing a current are provided, comprising an electrical source connected to said conductor.

In another preferred embodiment the rotor comprises a circuit support whereon the conductor is provided connected to the axis and whereby the conductor preferably exists of radial extending conductor parts. Said conductor defines a conductor angular reach, i.e. the angle between the most left and most right, preferably radial extending conductor part. In a preferred embodiment the conductor describes a circle segment. In an example the conductor extends in one or more turns or loops on a printed circuit board. The radical movement of the electrical or charged particle will provide for a maximalisation of the sin α (sin α=1) and therefore for a maximalisation of the qvB sin α. In a preferred embodiment the current wires extend perpendicular to the magnetic field lines. In a preferred embodiment a rotor device is attached to the axis and said rotor is provided with a current wire or with current wires, of which an essential part extends radially.

In another preferred embodiment the area defined by the conductor has the shape of a circle segment, and the number of the conductor parts is for example 2, 3, 4, 5 or 6, provided in a parallel alignment on the printed circuit board.

In another preferred embodiment the magnetic field is generated by a number of discrete permanent magnetic poles.

In another preferred embodiment the permanent magnet poles are positioned concentric around the axis.

In another preferred embodiment the magnetic field lines extend perpendicular to the rotor.

In another preferred embodiment the angular reach of the magnetic poles is limited to 180° and preferably around 70°.

In another preferred embodiment the rotor extends in an angular reach area of about 90° and preferably perpendicular to said axis.

In another preferred embodiment the rotor comprises a circuit printed on a circuit board and electrically connected and attached to the axis.

In another preferred embodiment the conductor angular reach is defined by a circuit comprising an electrical conductor provided in a specific pattern on the circuit support for example in a continuous circle segmented pattern around the axis having at least one, preferably more than one loop or turn.

In another preferred embodiment the flexible connecting means are provided for electrically coupling an electrical source with the rotor.

The invention also relates to a method for deflecting a laser beam with the use of a single mirror supported by an axis such that it can rotate about said axis, the method comprising: providing a magnetic field and providing a current wire such that the resulting Lorentz force controls the angle rotation of said axis, whereby the reach of the positioning is defined by the excess of angular reach, i.e. the excess of overlap of the cross sectional angular reach area of a magnetic field with the conductor angular reach area.

The invention further relates to a laser beam deflecting apparatus comprising two devices, the axis thereof extends in an angular reach area with respect to each other and they are further positioned such that a laser beam is deflected from the mirror of the first device to the mirror of the second device.

BRIEF DESCRIPTION OF THE DRAWINGS

The invention will be more clearly understood from the non-limitative description and the attached drawings showing the most preferred embodiment of the present invention. In said drawings.

DESCRIPTION OF THE PREFERRED EMBODIMENTS

As explained above the invention is related to angle rotation means for the accurate angle rotation of an axis carrying a mirror. The angle rotation according to the invention is based on the interaction of an electrical current (charged particles having charge q and velocity v) within a magnetic field. Variation in one of said parameters can result in a force, the Lorentz force, which may result in an accurate and fast angle rotation of the axis. The resulting Lorentz force is sufficiently strong that an axis whereupon this force acts is brought into rotating over a specific angular reach area corresponding to parameters B, q and v. In the present application the preferred embodiment is a device in which a current wire is either directly or indirectly connected via a support to the axis to be angle rotated. When applying a current during a specific time interval through these electrical wires or through a circuit placed within the magnetic field a resulting Lorentz force will act upon the axis and will rotate said axis. The magnetic field may be provided by a permanent magnet, an electromagnet, or any other suitable magnetic field generating means. The Lorentz force acting upon said axis results in an angle rotation over the angular reach area dependent upon the product B, q and v. The interaction of these parameters B, q and v and the angle α provides for an accurate control of the angle of rotation.

Figure 1:
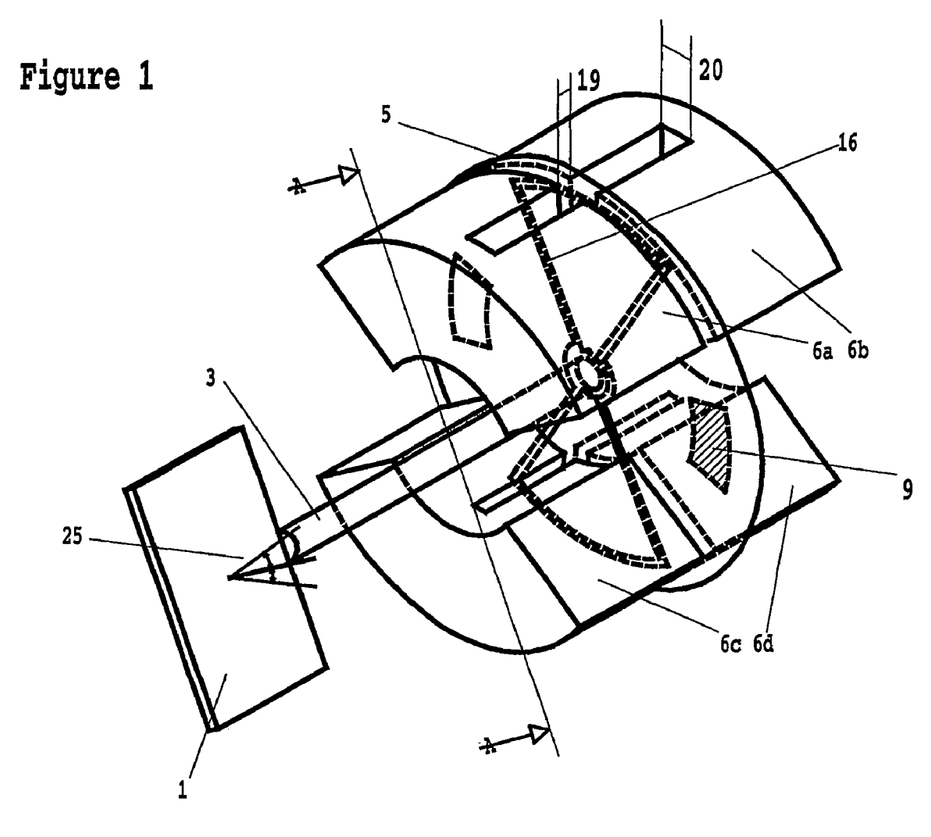
FIG. 1 is a schematic three-dimensional view of a preferred embodiment of the device according to the invention.

FIG. 1 shows the basic elements of the device according to the invention wherein a mirror 1 is fixed on the end of the axis 3 having a rotation range 25. A support 5 carrying an electrical wire 16 is attached on this axis 3 and can rotate back and forwards. The support 5 is positioned between two pairs of magnetic anchors 6a/b and 6c/d providing the magnetic field B. The device further comprises electrical conductors or wires 16 provided on the support 5 and positioning measurement means 9.

Upon introduction of a current and more in particular a charged particle having a velocity v through current wires 16, the mirror 1 associated with its axis 3 will be forced to rotate due to the resulting Lorentz force. This electrical current may be sent through a circuit support 5 containing an electrical wire or conductor 16 in a specific arrangement, which support 5 is rigidly connected to the axis 3. In comparison with the principle of a motor the combination of the axis 3 and the circuit support 5 can be considered as forming a rotor. Said rotor 3, 5 is specifically mounted in a magnetic field B, which may be static or dynamic. Preferably the current runs perpendicular to the magnetic field B as depicted in the figures in order to obtain a maximum in the resulting Lorentz force. A maximum in the Lorentz force resulting from the presence of magnetic field B and the current will act upon the electrical wires or the circuit 16 of support 5 and as such upon said rotor axis 3. The mirror 1, which is preferably rigidly mounted on said axis 3, is as such forced to rotate. Positioning measurement systems such as different electronic regulators, known in the prior art will guarantee that a right angle rotation of the rotor and the mirror provides for a right position of the deflected laser beam when present.

On the rotor 5 current is provided through the conductor(s) 16. The rotor 5 comprises a printed circuit board electrically connected to the axis 3. The conducted 16 describes two conductor angular reach areas in the form of a segment. The conductor 16 is therefore provided in two turns or loops in a continuous circle segmented pattern on the printed circuit board.

Figure 2:
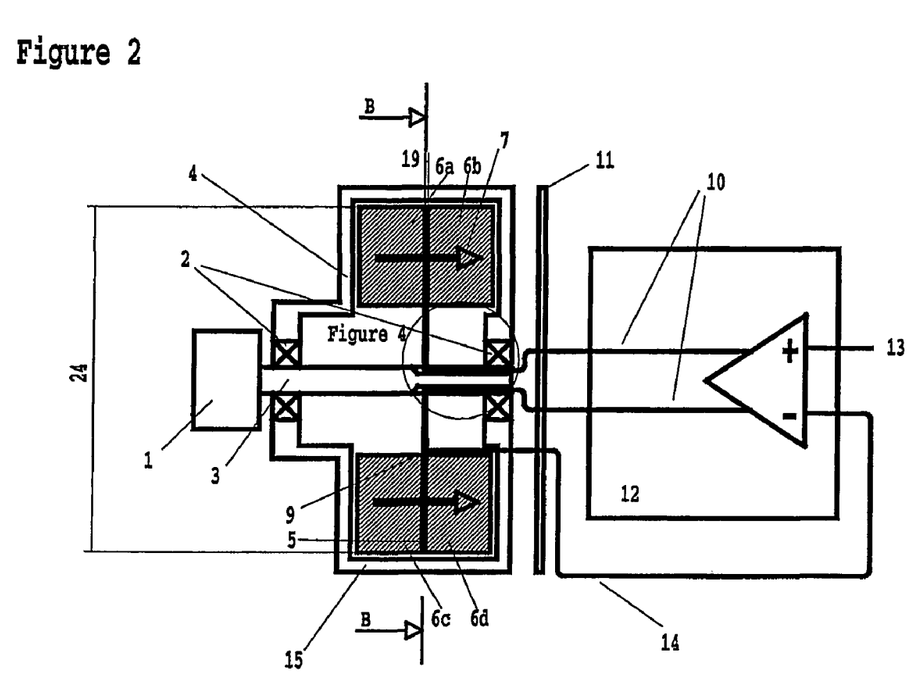
FIG. 2 is an axial cross-sectional view along line A—A of FIG. 1.

The device depicted in FIG. 2 comprises a mirror 1 which is supported by an axis 3 such that said mirror 1 is able to rotate about said axis 3. Bearings 2 may be provided within the housing 15 of the deflecting device. The means for orientating said mirror 1 comprise a rotor being the rigid combination of the axis 3 and the support 5. The support 5 is provided with one and preferably with several current tracts, wires or conductors 16, which are electrically connected with an electrical source containing regulator 12. The stator of the motor concept comprises a magnetic field and in a more preferred embodiment comprises one or more pairs of magnet anchors 6a and 6b (6c/d). Further positioning measurement means 9 are provided in order to control in a precise manner the position of the mirror 1. As these positioning means are known in the prior art they will herein not be explained in detail.

FIG. 2 shows the basic elements of the device according to the invention, inclusive the housing 15 and the regulator 12, whereby the mirror 1 is fixed on the axis 3 and the housing 15 is provided with bearings 2, to bear and let the axis 3 circulate. The support 5 is fixed on the axis 3 and rotates back and forwards and in the sleeve 19 between the poles of two pairs of magnetic anchors 6a/b and 6c/d. The static magnetic field 7 is present between the poles of the magnetic anchor pair. The device further comprises electrical conductors 10 which connect the rotor with the regulator printed circuit board 11, on which the regulator 12 is mounted. Regulation is done by comparison of a control signal 13 with the signal 14 from the positioning measurement means 9, both signals sent to the regulator 12.

The magnetic field lines describe in cross sectional view a segmented area (dotted line in FIG. 3) overlapping the angular reach 23 of the conductor or in other terms angular reach area 23 is smaller than the angular reach 26.

Figure 3:
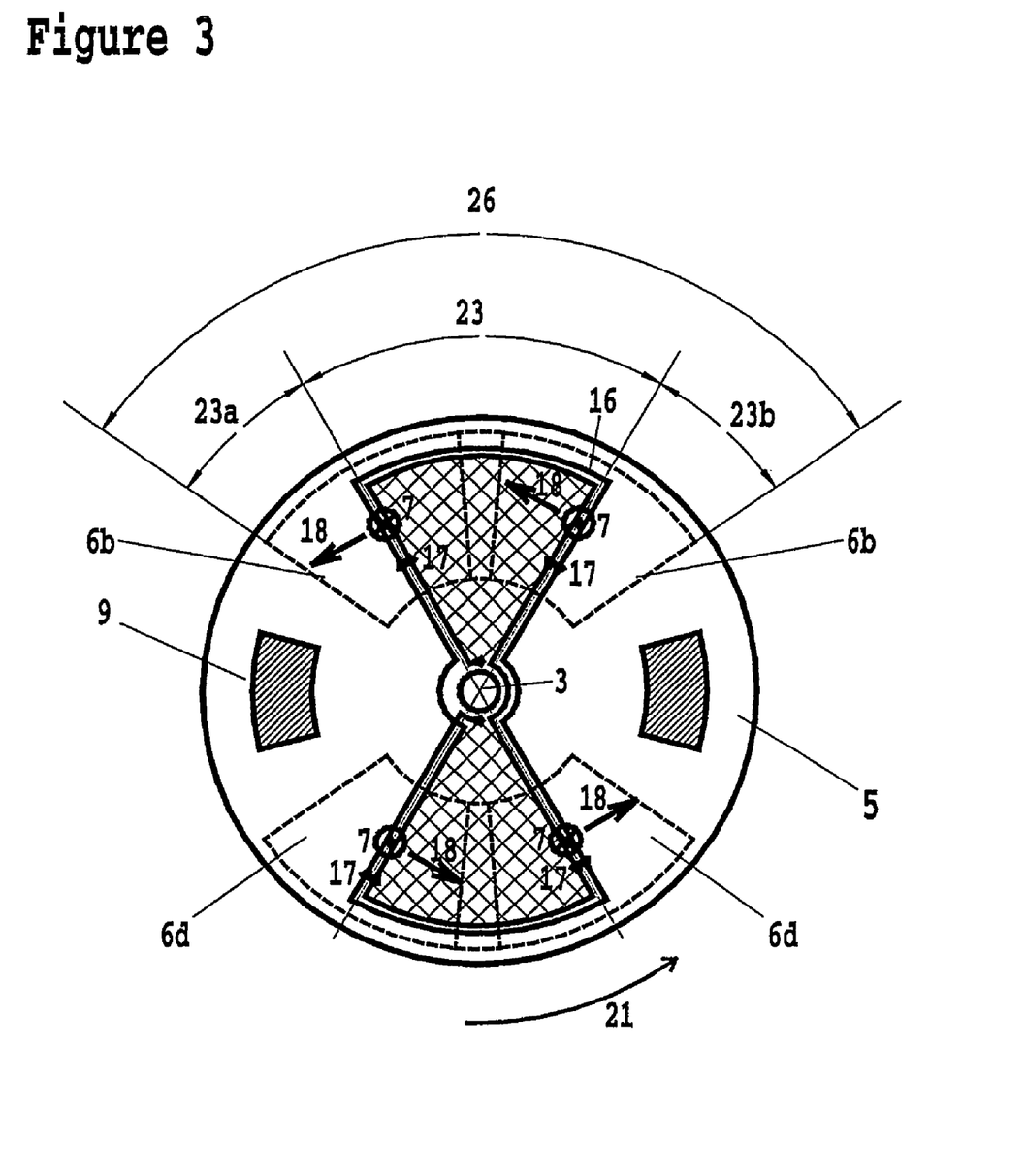
FIG. 3 is a radial cross-sectional view along line B—B of FIG. 2.

In a preferred embodiment the support 5 can be constructed as a printed circuit board having its conductors embedded therein or with a conductive metal plate provided thereon. Several possibilities can be used for a circuit board such as a single side printed circuit board, a double side printed circuit board or a multi-layer printed circuit board. The electrical conductors 16 on this printed circuit board are provided in a specific pattern. They are positioned in closed circle segment loops around the axis 3. The number of loops can be 1, 2, 3 or more. The angular reach area 23 between the conductor 16 defines the rotation angular reach 25 of the mirror 1. The importance of the specific pattern is to create as much as radial extending current conductor parts (current perpendicular=qv) to magnetic field (=B).

Current 17 through these conductors 16 originates from and is regulated by the regulator 12. The support 5 and the mirror 1 are mounted on the axis 3.

The mirror 1 is able to reflect a laser beam (not shown) to a work piece (not shown). In order to let the laser beam describe a certain route, the mirror 1 has to rotate back and forwards, regulated by a regulation signal, generated by the regulator 12. In order to rotate back and forwards, the mirror 1 is fixed to the axis 3. The resulting force 18 acting on the rotor 3,5 rotates the mirror 1. A preferred rotation range 25 of the mirror 1 is two times (back and forth) 22,5°.

The stator 6 can comprise permanent magnets or electromagnets. The stator 6 comprises one or more anchor pairs. In FIG. 1 two anchor pairs 6a/b and 6c/d are depicted. The two parts of an anchor pair are positioned pole to pole, separated by a thin air sleeve 19 wherein the rotor assembly (3,5) can rotate freely.

A magnetic field has to be present, wherein the rotor assembly (3, 5) can rotate. The direction of the magnetic field 7 is preferably perpendicular to the current 17 through the electrical conductors 16 of the support 5, as shown in FIGS. 2 and 3, in order to create the Lorentz force 18, which corresponds to the rotation 21 of the axis 3 and to the resulting oscillation of the mirror 1.

The angular reach of the anchors is preferably larger then the rotation range 25 of the support 5, in order to let the support 5 rotate over his range. In case the rotation range is 2×22,5°, the angular reach of the anchors is preferably about 70°.

FIG. 1 shows further anchors with a sleeve 20 in order to close the magnetic field lines. The stator 6 is fixed permanently in the housing 15. The height of the stator 6 decides the inner height of the motor assembly. Preferably it will have a height 24 of 1 to 10 cm. The steering signal 17 is produced by the regulator 12. Besides the control signal 13, the regulator receives also a signal 14 from the positioning measurement 9.

FIG. 3 shows schematically the capacitive measurement. One side of the capacitor(s) is (are) part of the support 5, the other side of the capacitor(s) is (are) part of the stator 6. Each position of the support 5 corresponds to another capacity value, as the plates of the capacitor 9 move against each other.

The regulator 12 is mounted on a printed circuit board (PCB) 11. The circuit on this PCB 11 regulates the current 17 through the electrical conductors of the rotor assembly (3, 5) by comparing the control signal 13 with the signal 14 of the positioning measurement 9.

Figure 4:
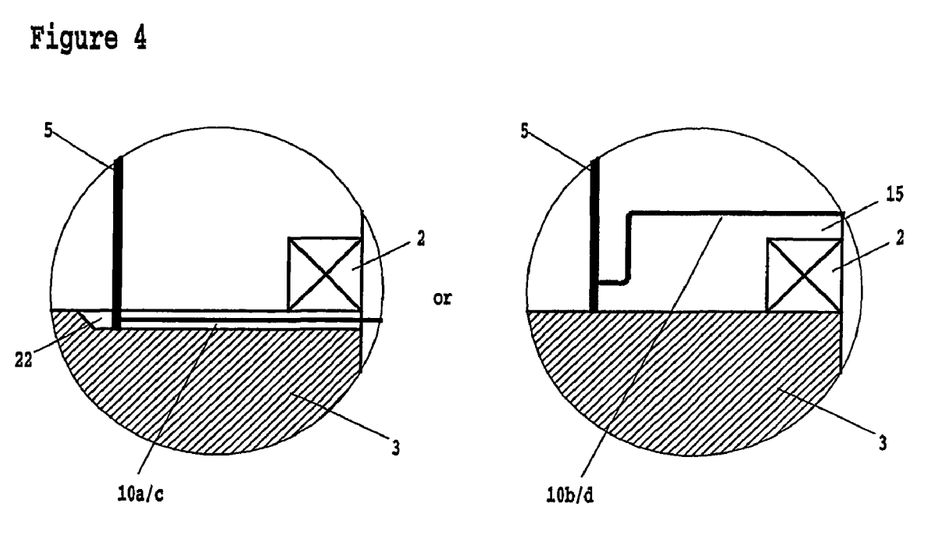
FIG. 4 shows schematic detailed views of the encircled fraction of FIG. 2.

FIG. 4 shows different ways of the electrical connection between the support 5 and the regulator 12. It can be done preferably by means of flexible conductive wires 10a, running through a sleeve 22, which is made in the axis 3 of the support 5 or by means of flexible conductive wires 10b, running through the housing 15 or by means of conductive spring material 10c, running through a sleeve 22, which is made in the axis 3 of the support 5 or by means of conductive spring material 10d, running through the housing 15.

The support 5 which is depicted in FIG. 3 comprises a base plate of the rotor, here as a PCB, mounted on the axis 3 with its electrical conductors 16, here two beside each other through which a current 17 runs. The direction is decided by the regulator 12, but due to the position of the support 5, the current 17 in the radial extending parts runs perpendicular to the magnetic field vector 7. The resulting Lorentz force 18 results in the rotation 21 of the rotor and a part of the positioning measurement 9 (only the part of the support 5 is shown). The angular reach 26 defined by the electromagnet has an angular excess, i.e. angle 23a and angle 23b, over the angular reach 23 of the conductor 16.

Figure 5:
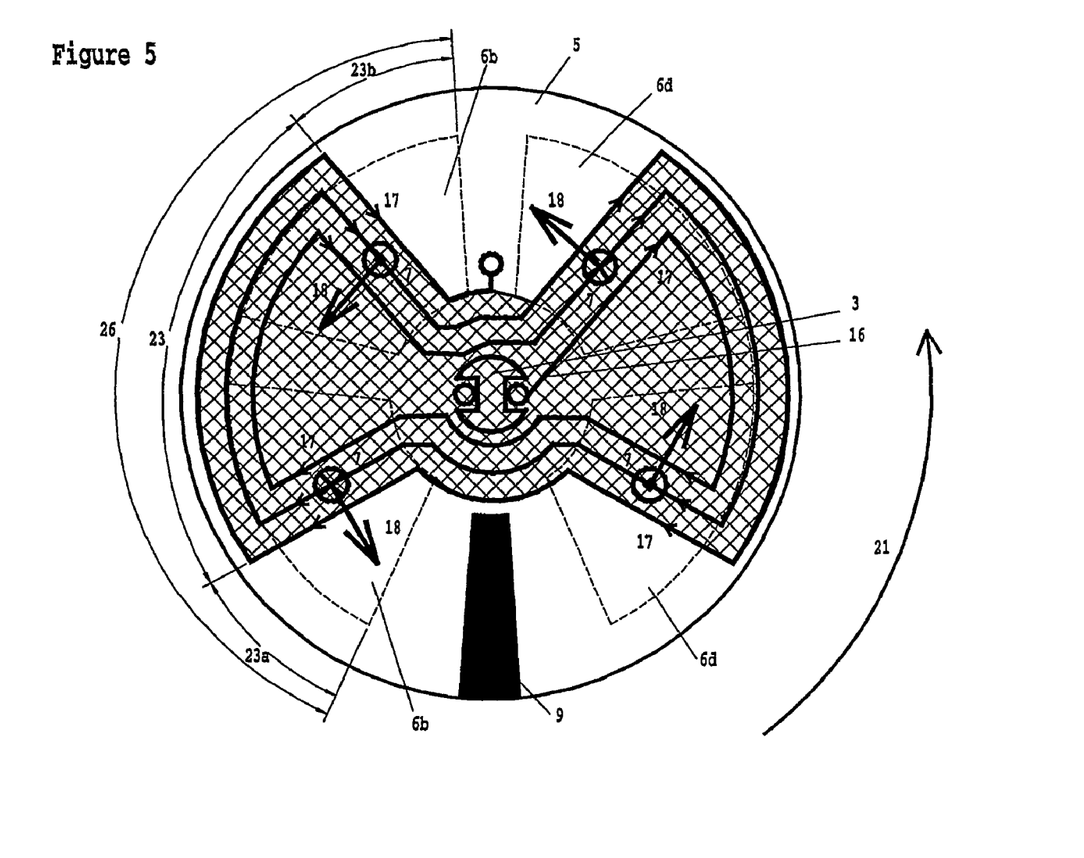
FIG. 5 shows a planar view of another preferred embodiment of a rotor of the present invention having a non-symmetrical pattern.

FIG. 5 depicts a planar view of another preferred embodiment of a rotor of the present invention having a non-symmetrical pattern. The hatched part in the drawing defines a conductor area corresponding to the angular reach 23.

Figure 6:
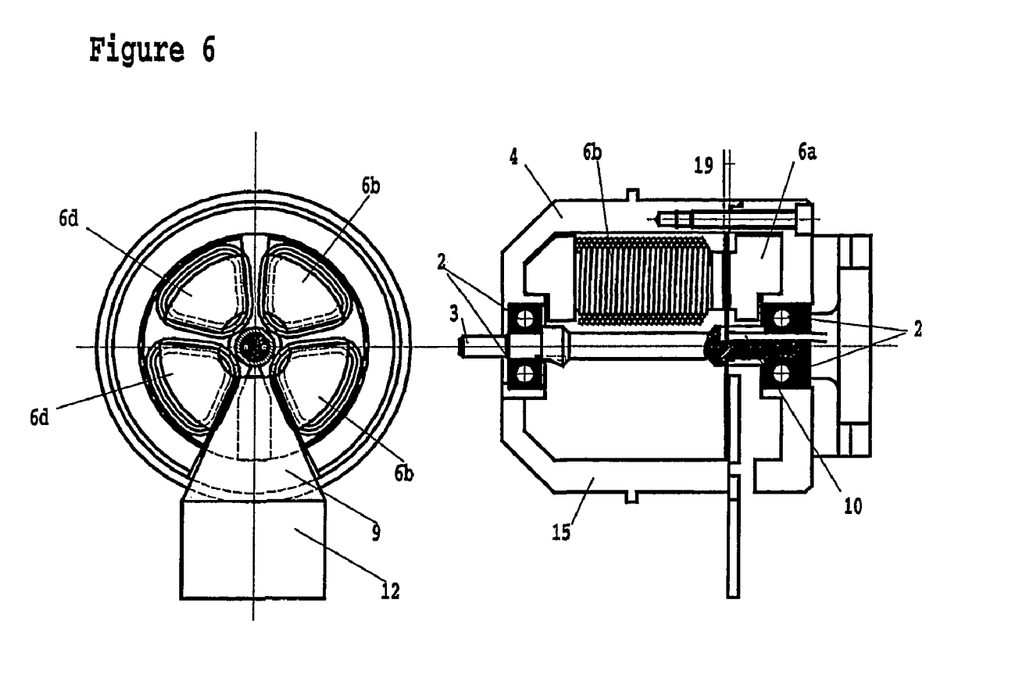
FIG. 6 shows two cross-sectional views (left in radical direction, right in longitudinal direction) elucidating the magnetic field suitable for a rotor of FIG. 5.

FIG. 6 shows two cross-sectional views (left in radial direction and right in longitudinal direction) elucidating the magnetic field suitable for a rotor of FIG. 5.

Figure 7:
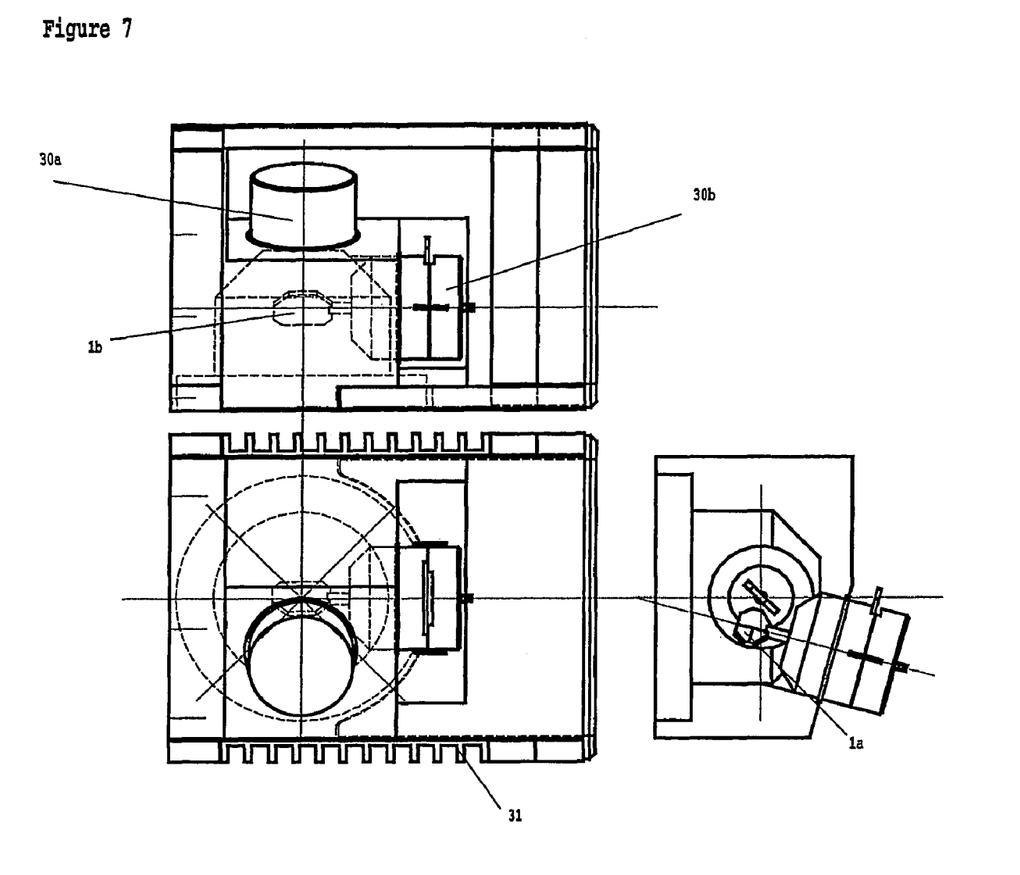
FIG. 7 shows schematically two oriented devices for deflecting a laser beam in the required directions.

FIG. 7 depicts schematically two mutual oriented devices for deflecting a laser beam 30a/30b able to deflect a laser beam in the required directions. Preferably the devices 30a/30b are housed in an aluminum housing 31.

It should be apparent that the disclosure and teachings of the present invention will suggest alternative designs to those skilled in the art.

The invention claimed is:

1. A device for deflecting a laser beam, comprising:
at least a single sided mirror; and
means for orientating said mirror,
wherein said single sided mirror is attached on one end of an axis and is arranged to rotate about said axis and
wherein the means for orientating said mirror comprise
means for providing a magnetic field, and
means for providing a charged particle having a velocity v moving through a conductor provided on a rotor which is connected to said axis, said conductor comprising radially extending conductor parts defining a conductor angular reach,
wherein the axis is able to perform a rotational movement over less than 180°, and whereby the orientation of said mirror is controlled by a resulting Lorentz force
wherein the magnetic field is generated by magnetic anchors,
whereby the rotor is positioned inside said magnetic field, and
whereby the angular reach defined by each magnetic anchor has a spatial overlap with the corresponding angular reach defined by the conductor, and whereby the excess of angular reach of the anchor corresponds to the angular reach for the orientation of the mirror.

2. A device according to claim 1, wherein the means for providing a current comprise an electrical source connected to said conductor.

3. A device according to claim 1, whereby the rotor is connected to the axis and consists of a circuit support whereon the conductor is provided.

4. A device according to claim 3, wherein the area defined by the conductor has the shape of a circle segment, and the number of the conductor parts is 2, 3, 4, 5 or 6, provided in a parallel alignment on the printed circuit board.

5. A device according to claim 3, wherein said conductor angular reach is defined by a circuit comprising said conductor parts provided in a specific pattern on the circuit support around the axis having at least one loop or turn.

6. The device of claim 5, wherein the specific pattern comprises a continuous circle segmented pattern.

7. A device according to claim 1, whereby the magnetic field is generated by a number of discrete permanent magnetic poles.

8. A device according to claim 7, wherein the permanent magnetic poles are positioned concentric around the axis.

9. A device according to claim 7, wherein the angular reach of the magnetic anchors is limited to 180°.

10. A device according to claim 1, wherein the magnetic field lines extend perpendicular to the rotor.

11. A device according to claim 1, wherein the rotor extends in an angular reach area of about 90°.

12. A device according to claim 1, wherein said rotor comprises a circuit printed on a circuit board, wherein said circuit board is electrically connected and attached to the axis.

13. A device according to claim 1, wherein the rotor extends perpendicular to said axis.

14. Device according to claim 1, wherein the means for providing a magnetic field comprise a number of discrete magnetic poles and the means for providing a charged particle having a velocity v, comprise an electrical source generating the movement of electrical particles through the conductor provided on the rotor.

15. A device according to claim 1, wherein the rotor is positioned inside a magnetic field generated by one or more pairs of magnetic anchors, whereby the two parts of one anchor pair are positioned pole to pole, and wherein the electrical particles moving through said conductor on said rotor have at least one loop.

16. A device according to claim 15, wherein said pairs of magnetic anchors act on said loop, and wherein each pair of magnetic anchors generates a Lorentz force in a same rotational direction.

17. A method for deflecting a laser beam with the use of a single mirror supported by an axis such that it can rotate about said axis, the method comprising:
generating a Lorentz force by providing a magnetic field and by providing means for providing a charged particle having a velocity v and moving through a conductor provided on a rotor which is connected to said axis, such that the resulting Lorentz force is obtained, whereby said magnetic field comprises discrete magnetic poles and the means for providing a charged particle having a velocity v comprises an electrical source generating the movement of electrical particles through the conductor provided on said rotor, and whereby said rotor is positioned inside the magnetic field generated by one or more pairs of magnetic anchors, whereby the two parts of one anchor pair are positioned pole to pole;
bringing the axis whereon said mirror is supported into rotation over a specific angular reach area by acting said Lorentz force onto the rotor which is fixed to said axis; and defining the angular reach for the orientation of the mirror by controlling the angle rotation of said axis whereby the reach of the positioning is defined by the excess of angular reach of the anchors such that said axis is adapted to perform a rotational movement over less than 180°.

18. A laser beam deflecting apparatus comprising:

a first mirror;

means for orientating said first mirror about a first angular reach area, wherein said first mirror is attached on one end of a first axis and is configured to rotate about said first axis;

wherein the means for orientating said first mirror comprise:

means for providing a first magnetic field; and means for providing a charged particle having a velocity v, and moving through a first conductor provided on a first rotor which is connected to said first axis, said first conductor comprising radially extending conductor parts defining a first conductor angular reach, wherein the first axis is able to perform a rotational movement over less than 180°, and whereby the orientation of said first mirror is controlled by a resulting Lorentz force, wherein the first magnetic field is generated by first magnetic anchors, wherein the first rotor is positioned inside said first magnetic field, and wherein the angular reach defined by said first magnetic anchors has a spatial overlap with the first conductor angular reach, and wherein the excess of angular reach of the first anchors corresponds to the angular reach for orientation of the first mirror;

a second mirror; and means for orientating said second mirror about a second angular reach area wherein said second mirror is attached on one end of a second axis and is arranged to rotate about said second axis wherein the means for orientating said second mirror comprises:

means for providing a second magnetic field and means for providing a charged particle having a velocity, v, and moving through a second conductor provided on a second rotor which is connected to said second axis, said second conductor comprising radially extending conductor parts defining a second conductor angular reach, wherein the second axis is able to perform a rotational movement over less than 180°, and whereby the orientation of said second mirror is controlled by a resulting Lorentz force wherein said second magnetic field is generated by second magnetic anchors, wherein the second rotor is positioned inside said second magnetic field, and wherein the angular reach defined by said second magnetic anchors has a spatial overlap with the second conductor angular reach, and wherein the excess of angular reach of the second anchors corresponds to the angular reach for orientation of the second mirror wherein the mirrors are positioned such that an incident laser beam is reflected from the first mirror to the second mirror.

* * * * *